Figure 1A:
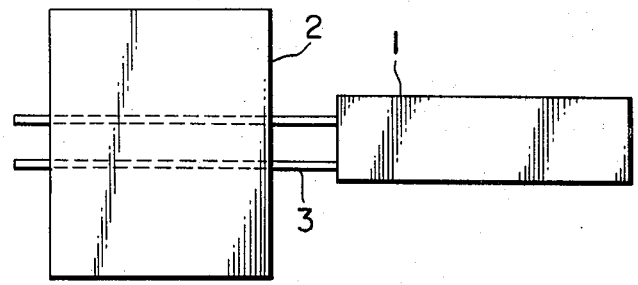

United States Patent
Murata et al.

[11] 3,868,510
[45] Feb. 25, 1975

[54] METHOD FOR SENSING PROFILE OF SHEET OR PLATE MATERIALS

[75] Inventors: Yuuji Murata; Yoshinori Mashiko; Yukio Uchida; Mitsuru Matsumoto, all of Tokai, Japan

[73] Assignee: Nippon Steel Corporation, Tokyo, Japan

[22] Filed: Dec. 20, 1972

[21] Appl. No.: 316,992

[30] Foreign Application Priority Data
Dec. 29, 1971 Japan.................................. 47-2935

[52] U.S. Cl.................. 250/366, 250/308, 250/367, 250/572
[51] Int. Cl................................................. G01t 1/20
[58] Field of Search....... 250/359, 219 DF, 219 TH, 250/306, 308, 452, 453, 491, 366, 367, 359, 572, 369

[56] References Cited
UNITED STATES PATENTS

| | | | |
|---|---|---|---|
| 2,730,566 | 1/1956 | Bartow et al. ..................... | 250/322 |
| 2,951,416 | 9/1960 | Shinn............................. | 250/219 TH |
| 3,155,831 | 11/1964 | Goodwin ....................... | 250/219 DF |
| 3,188,478 | 6/1965 | Binks............................. | 250/219 DF |
| 3,263,086 | 7/1966 | Brosius et al. ....................... | 259/359 |
| 3,509,341 | 4/1970 | Hindel et al. ....................... | 250/366 |
| 3,518,431 | 6/1970 | Rowe.................................. | 250/308 |
| 3,684,886 | 8/1972 | Muehllegner....................... | 250/366 |

Primary Examiner—Harold A. Dixon
Attorney, Agent, or Firm—Toren, McGeady and Stanger

[57] ABSTRACT

A method for sensing the profile of a sheet or plate material, in which the thickness of a sheet or plate material is measured by measuring the penetration damping amount of radiation (decrease of radiation due to penetration) within the sheet or plate material, wherein a radiation generating part only is made to scan the material in its crosswise direction while a radiation detector is fixed in place in such a manner as to extend for the entire width of the sheet or plate material corresponding to the radiation generating part, thus sensing the profile of the material.

5 Claims, 3 Drawing Figures

METHOD FOR SENSING PROFILE OF SHEET OR PLATE MATERIALS

The present invention relates to a sensing of the shape or cross-section (hereinafter called "profile") of sheet or plate materials such as plates, sheets and strips of steel, aluminum, plastics, etc., and particularly relates to a method for sensing the profile of a steel plate sheet and strip while it is being transported.

Heretofore, a number of research and development efforts have been made for sensing the profile of a steel plate or sheet.

Among such research and development efforts there have been efforts in which the profile of a steel sheet or plate is sensed by scanning the material in a direction vertical to the flow of the material, by means of a truck equipped with a radiographic type thickness meter as an X-ray thickness meter, a gammar-ray thickness meter, etc., so that the information thus obtained is fed back to the preceding process so that an optimum profile is obtained in the succeeding process, and wear or damage on rolls are detected from any local abnormality of the profile, thus enhancing the quality of products.

However, such conventional methods have many limitations in use as will be described below and are not satisfactory.

One object of the present invention is to conduct an accurate profile sensing of a steel plate even when the plate is moved.

The present invention will be described in reference to the attached drawings.

Figure 2:
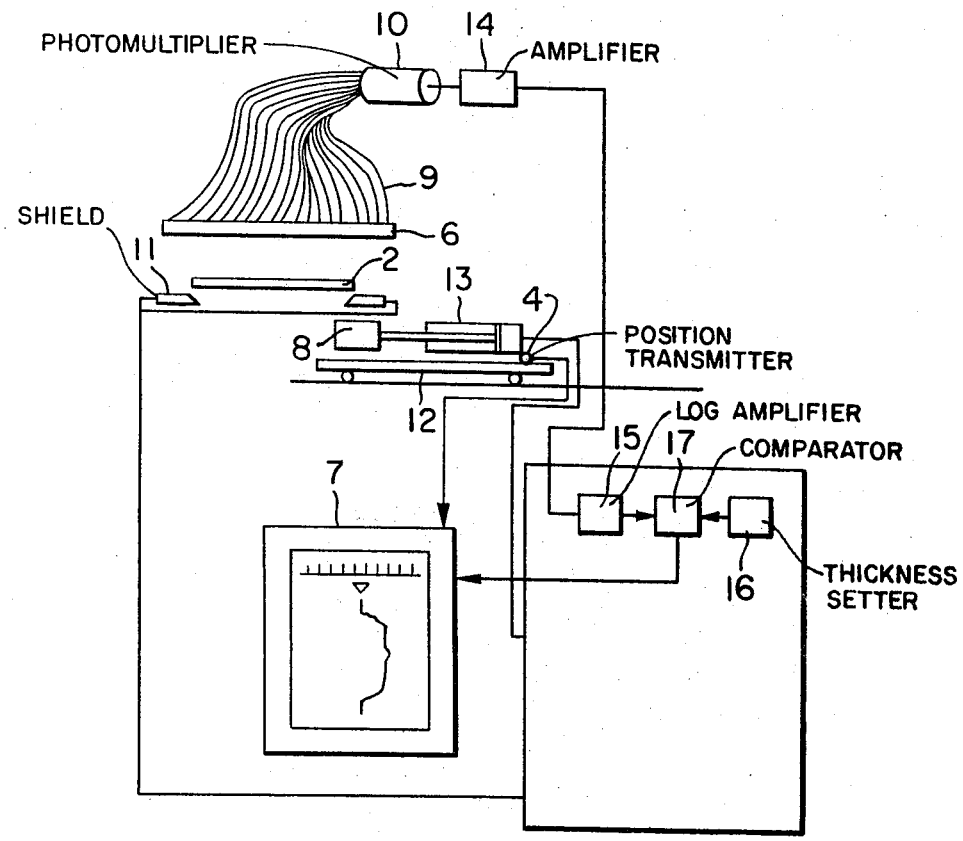

FIG. 1ab are schematic drawings in plan and in side elevation respectively to show a conventional method for sensing the profile of plate material. FIG. 2 is a schematic drawing to show an example of the present invention.

Figure 1B:
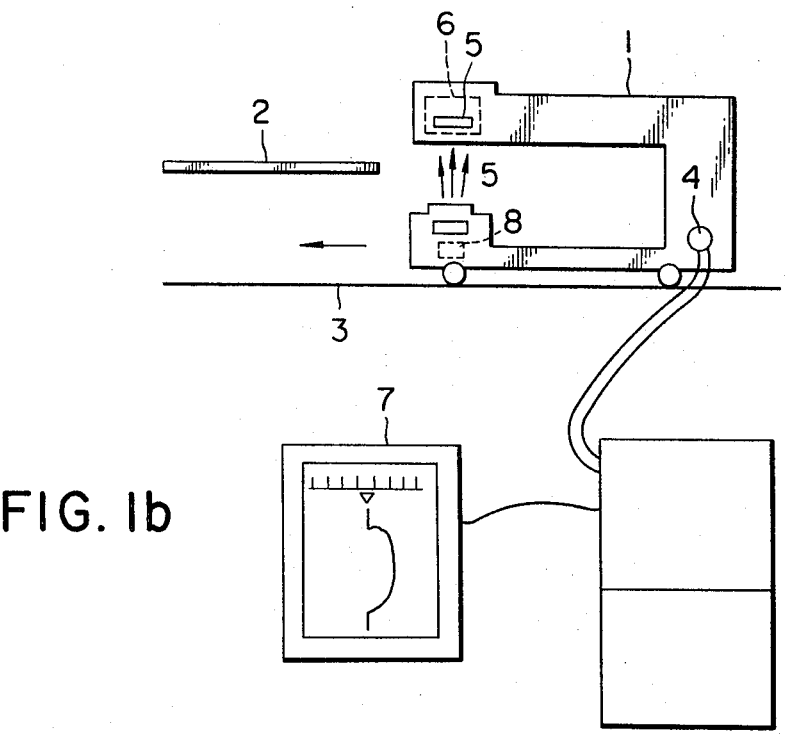

First, the conventional method and its shortcomings shall be explained referring to FIG. 1.

A truck 1 equipped with a radiation thickness gauge scans the steel plate 2 to be sensed in a direction vertical to the flow of the same while it moves on rails 3 with such driving force as electricity or hydraulic power, etc. At this time the position of the steel plate is detected by an edge detector 5 and a position transmitter 4 and a thickness at said detected point of the steel plate is detected by a radiation detector 6, whereupon each signal thereof is put into the X-axis and Y-axis of a recorder 7 thus making records thereof, thereby sensing the profile of the steel plate.

Since the radiation generating part and the radiation detecting part, etc. are all incorporated in the truck in this method, the weight of the truck becomes quite large, and not only is the scanning speed of the truck limited to some 2 to 10 m/min., but the vibration of the truck when it is shifted causes noise against the thickness signal.

Also when the truck comes into the edge of the steel plate radiation from the radiation generating part directly enters into the radiation detecting part. Therefore electric circuits are charged to their maximum limits, causing delay until a normal state is resumed. Therefore the truck must be stopped at the edge of the steel plate waiting until the electric circuit resumes its normal state.

Because of the above shortcomings, the sensing has been done conventionally with the steel plate to be sensed held in a stationary position.

If sensing is done when the steel plate is being moved, the steel plate is scanned in an extremely oblique way, and further there is a time delay at the edge of the steel plate. Thus, a precise profile scanning is difficult to attain.

On the other hand a method involving arranging a number of steel plate thickness gauges in a row in a crosswise direction of the plate can effect an approximate sensing of the profile, but precise and minute profile sensing is difficult. Furthermore if the number of the thickness gauges is increased to improve the accuracy, this results in not only very high cost but eventual difficulty in securing satisfactory accuracy because of practical difficulty in making uniform the characteristics of individual thickness gauges.

The principal feature of the present invention lies in the fact that the radiation detecting part is fixed and only the radiation generating part is made to scan.

The present invention shall be explained in details by an example of the same.

In FIG. 2, a radiation detector 6 is a flat detector provided separately from a truck, for example a plane scintillator, and is placed in a fixed position extending over the steel plate to be sensed, so that the maximum width of the steel plate may be covered thereby.

A radiation generator 8 is provided on a truck 12 to scan a steel plate 2 in a crosswise direction by a hydraulic cylinder 13.

Shielding plates 11 closely resembling the steel plate 2 to be sensed are provided for eliminating the saturation phenomenon at the steel plate edge portions, and are set in place beforehand prior to commencement of the sensing. When the steel plate 2 comes to pass underneath the radiation detector 6, the shielding plate 11 automatically follows the edges of the steel plate.

Next, the radiation generator 8 scans the steel plate 2 by a hydraulic cylinder 13 in a crosswise direction. Then the radioactive beam scans the steel plate in a crosswise direction penetrating the steel plate, resulting in such a dosage rate as to correspond to the thickness of the plate at respective points, and it is put into the radiation detector 6.

The radiation detector 6 in this example is made of a scintillator and the signal converted into light goes through light tubes 9 reaching a photo-electron multiplication tube 10, thereby connecting to an electric signal.

These are amplified and linearized by a forward amplifier 14 and a logarithmic amplifier 15, and are compared and amplified by a differential amplifier with the established plate thickness signal which has been set beforehand in a plate thickness setter 16.

The point of sensing in the crosswise direction of the steel plate is determined by a position signal transmitter 4.

The profile of the steel plate can be sensed by putting said two signals into the X-axis and Y-axis of a recorder 7.

Since the present invention has the arrangement and function described above, the scanning part is limited to the radiation generating part. Therefore, the scanning part can be made light-weight and high speed scanning can be achieved, and yet the vibration by scanning is small. Furthermore the problem by shock of sudden acceleration and reduction accompanying high speed scanning can be easily solved by making the scanning distance sufficiently long and by providing shock-absorbing rubber.

The delay in time at the edge portion of the steel plate can be easily solved by the edge shielding plates being set in place by the edge setting device.

Instead of providing the edge setting device, an arrangement may be employed wherein edges of steel plate are detected at the time of scanning by the radiation generator so that shieding plates provided at an irradiation opening of the radiation generator are made to be "IN" or "OUT" thereby.

As has been explained in detail, high speed in scanning is secured and the delay in time at the edge portion of the steel plate is eliminated by the present invention, and sensing of the profile of steel plate while it is being moved becomes easily possible.

What is claimed is:

1. A method for sensing the profile of sheet material wherein the thickness of said sheet material is measured by measuring the penetration damping of an amount of radiation being emitted from radiation generating means located on one side of said sheet material with the decrease in radiation due to penetration within the sheet material being sensed by radiation detecting means located on the opposite side of said sheet material, said method comprising the steps of moving said radiation generating means at a relatively high speed to rapidly scan said sheet material in a crosswise direction of the material and simultaneously maintaining said radiation detecting means stationary in a position wherein said detecting means extends for the entire width of the sheet material being scanned by said radiation generating means thereby to sense the profile of said material.

2. A method according to claim 1 wherein the scanning span of said radiation generating means is longer than the width of said sheet material to be measured, wherein shock caused by sudden acceleration or deceleration during high speed scanning is relieved within the portion of the scanning span exceeding the width of the material to be measured, and wherein the radiation generating means scans at a constant speed within the width of the material to be measured.

3. A method according to claim 1 wherein prior to the beginning of the measurement of said sheet material, shielding plates formed of a material similar to the material to be measured are placed at the edge portions of the material to be measured in order to eliminate saturation phenomenon, and wherein, while the material to be measured passes below the radiation detector, said shielding plates are caused to follow the edges of the material to be measured.

4. Apparatus for sensing the profile of sheet material wherein the thickness of said sheet material is measured by measuring the penetration damping of an amount of radiation passing through said material resulting in a decrease of radiation due to penetration within the sheet, said apparatus comprising radiation generating means located on one side of said sheet material, means for moving said radiation generating means at a relatively high speed to rapidly scan said sheet material in a crosswise direction thereof, radiation detecting means located on an opposite side of said sheet material, said detecting means being held fixed in a stationary position and extending for the entire width of said sheet material being scanned by said radiation generating means, and a shielding plate arranged to follow the edge portions of said material to prevent response delay at said edge portions.

5. Apparatus according to claim 4, including means for detecting the position of an edge portion of said sheet material and for detecting the position of said radiation generating means.

* * * * *